Oct. 29, 1968   J. G. SATTERTHWAITE ETAL   3,407,779
MARINE BEARING
Filed Dec. 21, 1965   4 Sheets-Sheet 1
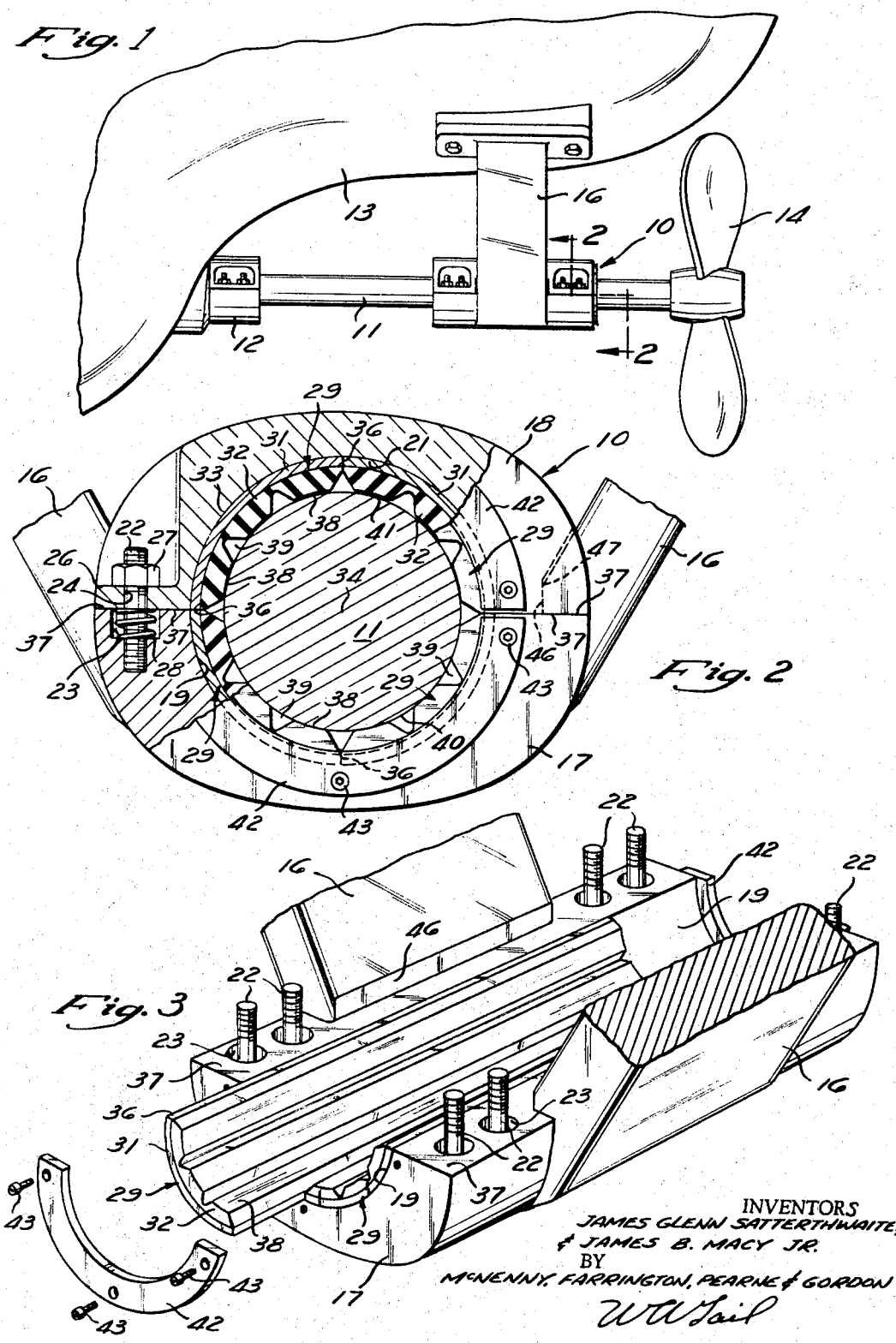
INVENTORS
JAMES GLENN SATTERTHWAITE,
& JAMES B. MACY, JR.
BY
M°NENNY, FARRINGTON, PEARNE & GORDON
ATTORNEYS

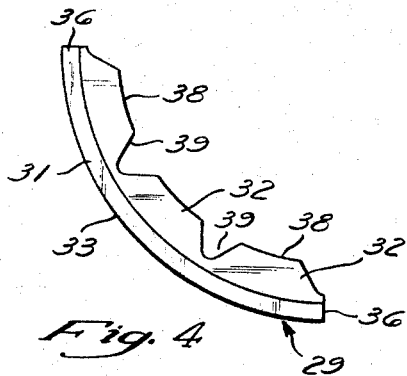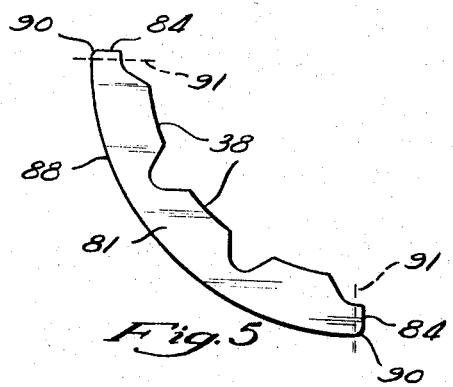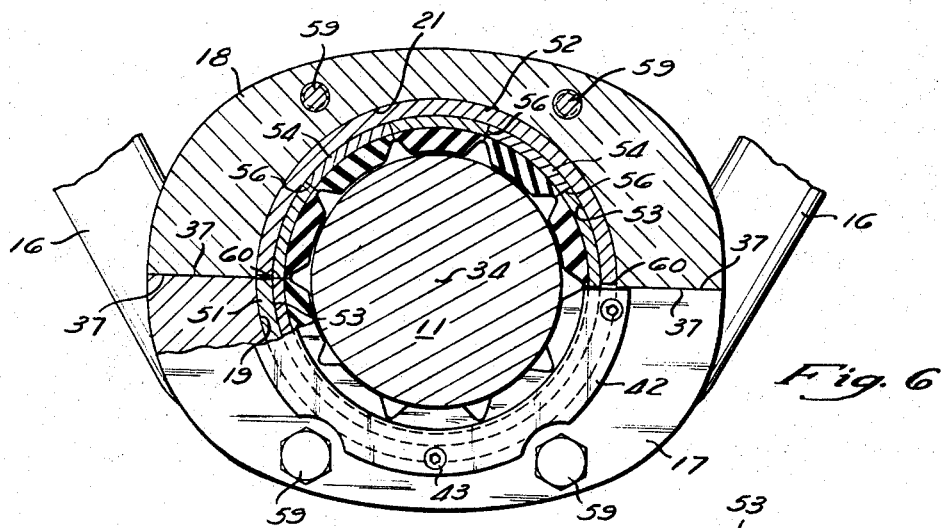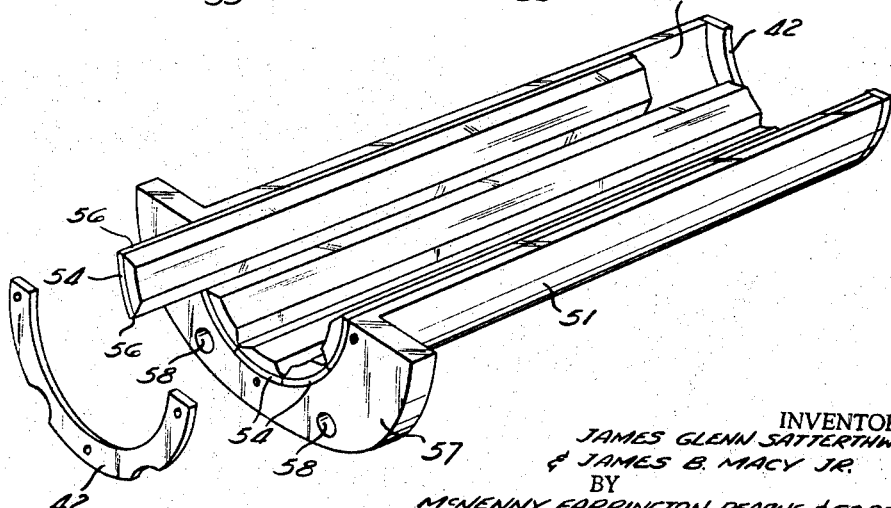

INVENTORS
JAMES GLENN SATTERTHWAITE,
& JAMES B. MACY JR.
BY
McNENNY, FARRINGTON, PEARNE & GORDON

ATTORNEYS

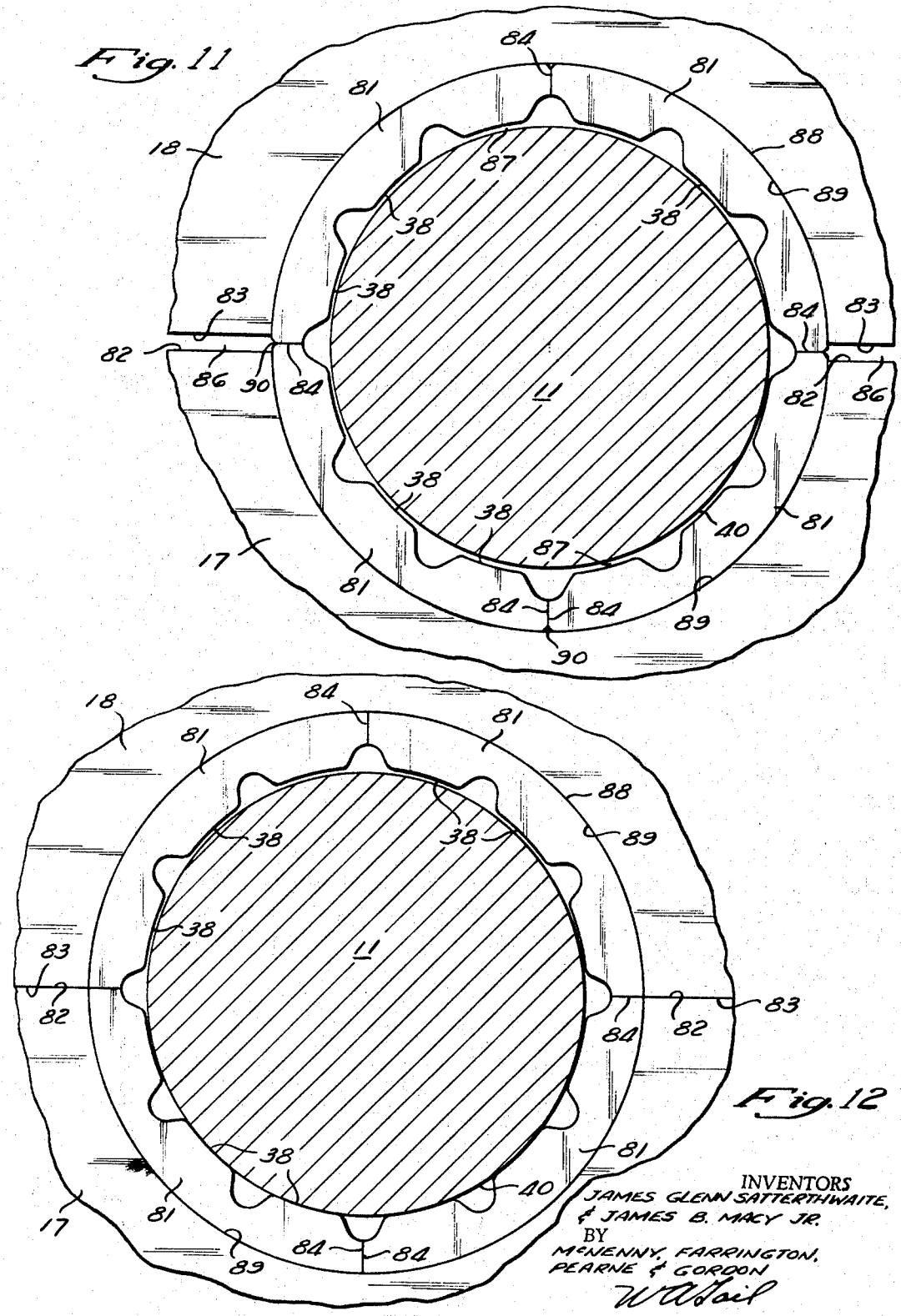

United States Patent Office 3,407,779
Patented Oct. 29, 1968

3,407,779
MARINE BEARING
James Glenn Satterthwaite, 1 Dogwood Trail, Chesapeake, Va. 23320, and James B. Macy, Jr., 107 Holly Lane, Morehead City, N.C. 28557
Continuation-in-part of application Ser. No. 246,964, Dec. 26, 1962. This application Dec. 21, 1965, Ser. No. 515,395
13 Claims. (Cl. 115—34)

ABSTRACT OF THE DISCLOSURE

A marine bearing including a plurality of elongated stave elements which cooperate to provide a bearing around a shaft. The bearing is provided by elastomeric rubber-like material and in one embodiment, the entire stave is formed entirely of such material. In other embodiments each stave is provided with a rigid backing member which may be formed of metal. The outer surface of the staves are portions of a cylinder and when the staves are assembled, cooperate to define a cylindrical surface. The staves are releasably clamped in a housing by radial pressure and are locked into position only by the frictional forces resulting from the radial pressure. The housing is arranged so that locking pressure can be released and the staves can be moved circumferentially and axially with respect to the housing and shaft. This permits the stave to be assembled or disassembled in place around the shaft and greatly simplifies installation and repair.

---

This is a continuation-in-part of our copending application Ser. No. 246,964, filed Dec. 26, 1962, now Patent No. 3,236,570. The present invention relates generally to marine bearings and, more particularly, to a novel and improved propeller shafting bearing constructed and arranged to permit installation and repair without assembly or disassembly of the bearing over the end of the propeller shaft. Previous general practice has required the removal of the shaft from the bearing by endwise movement of the shaft or by endwise movement of the bearing until the members disassemble. Further, the structure is arranged so that the assembled bearing accurately fits the shaft, thereby improving bearing life and minimizing vibration.

A novel and improved bearing assembly incorporating this invention combines a housing assembly and a plurality of accurately positioned segmental bearing elements referred to hereinafter as "staves" which cooperate to provide a bearing surface surrounding the propeller shafting. The housing assembly includes clamping means to radially press and lock the staves in the desired installed position. The mating surfaces of the stave assembly and housing assembly are cylindrical so release of the clamping pressure permits both axial and circumferential movement of the staves for repair and servicing. With this structure it is not necessary to provide irregular shapes, tongues and grooves, or lock screws to secure the staves in the assembled position.

In addition, stop means cooperate with the clamping means to insure that the inner bearing surface of each stave is precisely positioned with respect to the inner bearing surfaces of the other staves of the assembly, and with respect to the propeller shafting.

In the illustrated embodiments of this invention, the inner bearing surface of the staves is formed by soft elastomeric material, preferably rubber. Longitudinally extending grooves conduct water into the bearing to provide water lubrication of the bearing surfaces. In the illustrated embodiments these grooves are longitudinal but other types of grooves, such as helical grooves, may be used if desired.

In one illustrated embodiment of this invention each stave includes a curved, rigid backing member with elastomeric material bonded to its concave inner surface. The longitudinal edges of the backing members are radial with respect to the axis of the stave assembly and interengage with similar adjacent edges to insure proper positioning and locking of the staves. Opposed stop surfaces on the housing abut when assembly is complete and limit compressive stress on the staves.

In another illustrated embodiment of this invention, the entire stave is formed of an elastomeric material, preferably rubber, and the proportions of the staves and housing assembly are such that the clamping means radially contract the staves from their unstressed condition to prestress the elastomeric material. Here again, the housing assembly is provided with stop means to limit the degree of radial contraction so that the inner bearing surface of each stave is precisely located with respect to the inner bearing surface of the other staves.

The inner bearing surface of each stave is initially shaped to closely fit the exterior surface of the propeller shafting. With such a structure, deformation of the elastomeric material is not required to produce substantial bearing contact area and the unit pressure on the bearing surface is substantially minimized in any given bearing zone.

It is possible to size the elements for minimum clearance and to use a concave inner bearing surface on the staves because the bearing assembly incorporating this invention need not be assembled over the end of the shaft and because the inner bearing surfaces of the staves are accurately positioned during the assembly. If the bearing assembly must occur over the end of the shaft, excessive clearance must be provided because surface friction occurs between the shafting and bearing surfaces. For a given installation, increased bearing area is provided and the unit pressure on the bearing surfaces is substantially minimized throughout the full length of bearing. Further, the provision of reductions in the amount of clearances substantially reduces vibration due to shaft deflection and improves service life by minimizing unequal propeller thrust impulses.

It is an important object of this invention to provide a novel and improved marine bearing assembly combining a housing assembly and a plurality of bearing staves removably positioned in the housing assembly wherein the staves cooperate to define a smoothly curved outer surface mating with a similar surface on the housing assembly, and the housing assembly is provided with means to radially press the staves inwardly to lock the staves in the assembled position. Stop means are provided to limit inward movement of the staves created by the clamping force to accurately position the bearing surface of each stave with respect to the bearing surface of the other staves.

It is another important object of this invention to provide a novel and improved marine bearing according to the preceding object, wherein the bearing surface is formed of an elastomeric, rubberlike material shaped to conform to the exterior of a shaft journalled in the bearing without appreciable deflection created by the load of an engagement between the shafting and bearing surface.

It is still another object of this invention to provide a novel and improved marine bearing assembly according to the last preceding object wherein each stave is provided with a rigid backing member serving to engage adjacent backing members and proportioned to be tightly gripped during bearing assembly.

It is still another object of this invention to provide a novel and improved marine bearing assembly combining a plurality of removable staves formed entirely of an elastomeric or rubberlike material and a housing assembly operable to radially contract the staves to a predetermined stress condition and lock them in assembled position.

It is still another object of this invention to provide a novel and improved marine bearing assembly according to any of the preceding objects wherein the housing assembly provides separable members to releasably grip and lock a plurality of bearing staves in the assembled position.

Further objects and adavantages will appear from the following description and drawings wherein:

FIGURE 1 is a fragmentary side elevation of a vessel with a marine bearing incorporating this invention mounted to support the propeller shaft of the vessel;

FIGURE 2 is an enlarged, fragmentary cross section taken along 2—2 of FIGURE 1;

FIGURE 3 is an exploded, perspective view of the bearing illustrated in FIGURE 2, with the top housing member removed and illustrating one stave in a partially removed position;

FIGURE 4 is an enlarged end view of the bearing stave illustrated in FIGURES 2 and 3;

FIGURE 5 is an end view of a modified form of bearing stave formed without a rigid backing member;

FIGURE 6 is an end view of a second embodiment of the marine bearing incorporating this invention wherein a liner member is provided as part of the housing assembly and wherein the parts are shown partially in section to illustrate structural detail;

FIGURE 7 is an exploded perspective view of a single liner illustrated in FIGURE 6, illustrating one method of removal of the bearing staves;

FIGURE 11 is an enlarged, fragmentary cross section of still another embodiment of this invention wherein the bearing staves are formed entirely of elastomeric material and wherein the elements are illustrated in partially assembled position; and FIGURE 12 is a cross section similar to FIGURE 11, illustrating the elements in the final assembled position.

Figure 8:
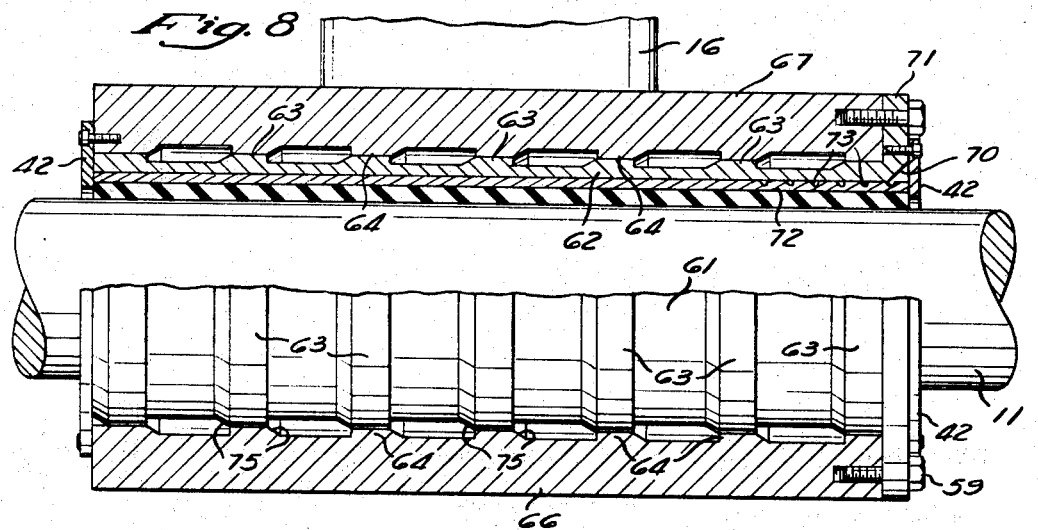
FIGURE 8 is a longitudinal section of another embodiment of bearing assembly illustrating the elements in the assembled position.

A bearing incorporating this invention may be mounted along the shafting inboard of the vessel hull, at the point where the shafting emerges from the hull, or outboard of the hull. The inboard bearings are provided with suitable lubrication means which supply water or other lubricant to the bearing surfaces. The outboard bearings are submerged and are preferably water lubricated.

FIGURE 1 illustrates one typical installation of a marine bearing assembly 10 adjacent to the outboard end of the propeller shaft 11. The shaft 11 extends out through a stern bearing tube 12 from the interior of the hull 13 and supports a propeller 14 at its end. Both of the bearings 10 and 12 incorporate this invention but only the bearing 10 is described in detail.

The bearing assembly 10 is provided with a pair of struts 16 which are bolted, welded, or otherwise suitably fastened to the hull structure 13 to support the bearing assembly 10. It should be understood that during the operation of the vessel, the bearing assembly 10 is submerged.

Referring now to FIGURES 2 through 4, the bearing assembly includes a housing assembly consisting of a lower housing member 17 and an upper housing member 18. The struts 16 are integrally formed on the lower housing member 16. The two housing members 17 and 18 are formed with longitudinally extending clamping surfaces 19 and 21 respectively. These surfaces are proportioned so that they cooperate to define a cylindrical inner surface when the upper clamping member 18 is assembled on the lower housing member 17, as illustrated in FIGURE 2.

A plurality of stud bolts 22 are thereaded into the lower housing member 17 and project up through associated counterbores 23 and through bolt holes 24 formed in a flange section 26 in the upper housing member 18. Nuts 27 are threaded onto each of the stud bolts 22 and engage the upper face of the flange 26 to press the upper housing member 18 downwardly toward the lower housing member 17. Springs 28 are positioned in the counterbore 23 around the stud bolts 22 to resiliently urge the upper housing assembly in an upward direction and to lift the upper housing member 18 away from the lower housing member 17 when the nuts 27 are loosened.

Positioned within the two housing members 17 and 18 around the propeller shaft 11 are a plurality of bearing staves 29. In the embodiments of FIGURES 2 through 4 there are four similar staves 29, each extending 90 degrees around the shaft 11. In the illustrated embodiment, each of the staves is identical and includes a curved, rigid backing member 31 with an inner bearing material 32 bonded to the inner surface of the backing members 31.

In the illustrated embodiment, the bearing material is elastomeric material, preferably relatively soft rubber. The outer surfaces 33 of the backing members 31 are proportioned so that the staves 29 cooperate to provide a cylindrical outer surface mating with and engaging the clamping surfaces 19 and 21 of the housing members 17 and 18. When the bearing is assembled, the clamping surfaces 19 and 21 and the collective outer surfaces 33 define surfaces of revolution about a central bearing axis 34.

The longitudinal edges 36 of the backing members 31 are radial with respect to the axis 34 and contained in a plane containing the axis 34. Each of the longitudinal edges 36 of each of the backing members 31 engages an adjacent longitudinal edge of an adjacent stave backing member 31 and functions to limit the inward movement due to the clamping action by the nuts 27 of the housing assembly.

The unstressed size of the stave backing members 31 are proportioned so that they are in engagement along their edges 36 before the opposed surfaces 37 on the housing members 17 and 18 engage. Therefore, the continued tightening of the nuts 27 until the surfaces 37 engage causes compression of the backing members and radial locking pressure between the staves and housing. In the embodiment of FIGURE 3 the backing members 31 are metal and are each about 0.002 inch to 0.003 inch oversize, between their edges 36, when they are unstressed. The amount of backing member oversize determines the amount of radial gripping for a given backing member material. The elastic modulus of the material used to form the backing members should be taken into consideration when establishing the dimensions of the parts.

The bearing material 32 is formed with inner bearing surfaces 38 which are also surfaces of revolution about the axis 34 when the bearing is assembled. The bearing material is also formed with longitudinal or helical grooves 39 symmetrically positioned around the shaft 11. These grooves are open at their ends and supply lubrication to the bearing surfaces 38. When the bearings are outboard and submerged water flows along the grooves to lubricate the bearings. The inner bearing surfaces 38 are shaped so that when the staves are assembled they define an interrupted cylindrical surface around the axis 34 providing a slight clearance with the outer surface 40 of the shaft 11. The weight of the shaft 11 causes the engagement of the outer surface 40 to occur along the lower half of the bearing and the clearance 41 appears adjacent the upper side of the shaft. The bearing surfaces 38 of the staves are initially shaped to closely match the curavture of the outer surface 40 of the shaft 11. Therefore, substantially no deflection is required in the bearing material to produce a relatively large area of surface contact and the unit pressure of engagement between the shaft and bearing surface is substantially minimized for any given zone. Consequently, bearing material wear is minimized and close tolerances can be maintained to prevent objectionable vibration. This is all possible because the bearing need not be assembled over the end of the shaft and because the structure is arranged to accurately position the inner bearing surfaces 38 of the various staves 29.

It is not necessary to provide separate locking means to resist the torsional loads tending to rotate the bearing staves, since the clamping force produced by the tightening of the nuts 27 produces a radial pressure between the outer surface 33 of the backing member 31 and the clamping surfaces 19 and 21. This clamping pressure remains even under operating conditions and is added to any load created on the individual staves by the shaft. Also, the fact that the inner bearing surfaces are lubricated results in a lower coefficient of friction than the non-lubricated exterior stave surfaces so that the friction torque resisting turning of the staves always exceeds the friction torque between the shaft and inner bearing surfaces. Because the clamping occurs along a smooth cylindrical surface, proper positioning of the staves is achieved without difficulties which occur when dovetails or other inter-engaging projections are provided between the staves and housing.

A removable end plate 42 is secured by bolts 43 to each end of each of the housing members 17 and 18. These end plates 42 cooperates to insure proper axial location of the bearing staves within the housing assemblies. The various proportions are arranged so that the plates 42 grip the ends of the staves.

The disassembly and reassembly of the bearings are preferably accomplished as follows. The nuts 27 are loosened, allowing the upper housing member 18 to be moved upwardly by the springs 28. This releases the radial clamping pressure on the staves. The propeller shaft 11 is then lifted by any suitable means, such as a chain hoist, from the hull 13 or, if the vessel is in drydock, by any suitable jacking means, so that weight of the shaft 11 is lifted off the bearing. Preferably, the shaft is raised until clearance is present entirely around the shaft surface 40. The end plates 42, at least at one end, are then removed and the bearing staves 29 are free to be moved axially out of the housing, as illustrated in FIGURE 3. If desired, the end plates at both ends may be removed so that the staves can be pushed out of the housing.

After removal of the worn staves, new staves may be positioned in the bearing by sliding them along the housing into the assembled position. In many instances, the lower staves 29 will be replaced because they wear more rapidly then upper staves. In such instances, it is common practice to slide the upper staves circumferentially around the shaft to the lower position. New staves are then inserted in the upper position. Because a smooth cylindrical surface is provided between the staves and housing, it is easy to move the staves either axially or circumferentially around the bearing.

After the staves are properly positioned, the end plates 42 are replaed and the nuts 27 are again tightened to the required torque to complete the reassembly. The shaft 11 is then released and the repair or servicing operation is completed.

Interengaging vertical surfaces 46 and 47 on the housing members 17 and 18, respectively, insure accurate lateral positioning of the upper housing member 18 with respect to the lower housing member 17. However, if desired, these guide surfaces need not be used if the staves are installed so that the backing member 31 of the staves extends across the joint between the two housing members.

The rigid backing members 31 may be formed of any suitable corrosion-resistant metal or nonmetal that provides sufficient strength and rigidity. The housing members and clamping structure are preferably formed of a corrosion-resistant metal, such as bronze or the like, however, steel is used in large installations.

The embodiment illustrated in FIGURES 6 and 7 is similar in many respects to the embodiment of FIGURES 2 through 4. Therefore, similar reference numerals are used for similar elements of the assembly. In this instance, the housing assembly includes a lower housing member 17 cooperating with an upper housing member 18 wherein the two housing members 17 and 18 are provided with inner gripping surfaces 19 and 21, respectively. In this embodiment, however, a pair of liner members 51 and 52 are positioned in engagement with the clamping surfaces 19 and 21, respectively, and are provided with inner walls 53 cooperating to form a cylindrical surface against which the staves 54 are positioned.

In the embodiment illustrated in FIGURES 6 and 7 there are ten staves, each extending along an arc of 36 degrees and cooperating, when assembled, to extend around the shaft 11. The longitudinal edges of the staves 56 interengage the adjacent edges of adjacent staves to provide the desired compression stress. Contraction of the staves under the influence of the clamping nuts is limited by the stop action of the housing surfaces 37. Here again, the edges of the staves are radial with respect to the bearing axis 34 when the bearing is assembled, and extend along planes containing the axis 34.

The liners 51 and 52 are provided with end flanges 57, as illustrated in FIGURE 7, which fit against the end faces of the associated housing members 17 and 18. The flanges 57 are provided with bolt holes 58 which receive cap screws 59 threaded into the associated housing member to axially position the liners. The housing members 17 and 18 and the liners 51 and 52 are proportioned so that clearances are provided at 60 to insure that the clamping results in proper clamping of the backing members of the staves. In this instance end plates 42 are removably mounted on the liners rather than on the housing members. The use of more stave elements reduces manufacturing cost because a smaller mold is required. Also in large bearings, the use of more staves is desirable, since the weight of each stave is reduced and the staves are against torsional loads.

In this embodiment, the ends of the staves 54 are clamped between the end plates 42 even when the radial gripping is released so it is possible to shift all of the top staves from the upper housing 18 around the shaft to the lower housing 17 a a unit. The staves may be removed individually as illustrated in FIGURE 7, or the staves may be removed along with the liners as a unit. Here again, the radial gripping force provides the locking of the staves and the liners. The bolts 59 merely provide axial positioning and are not intended to support the liner against torsional loads.

Figure 9:
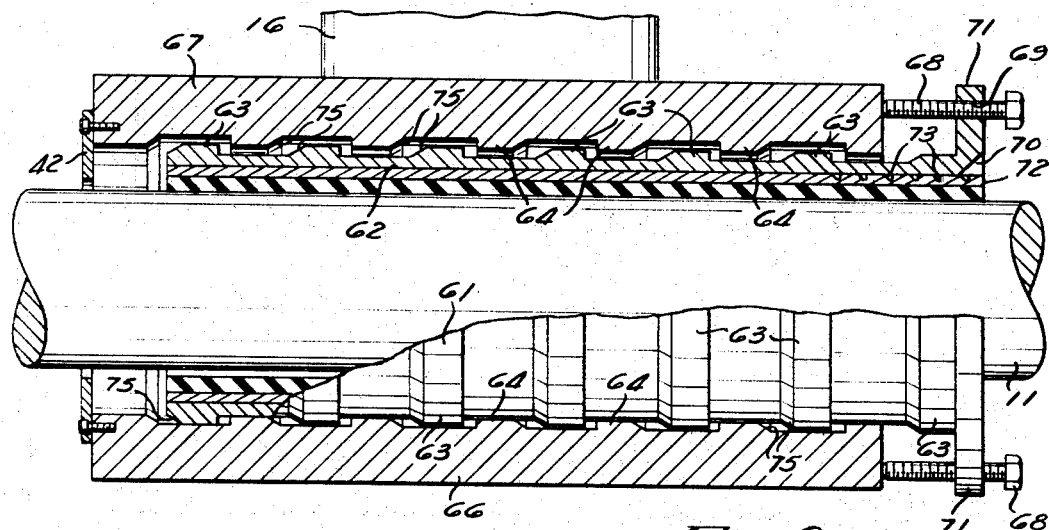
FIGURE 9 is a view similar to FIGURE 8 illustrating the elements in an intermediate stage of disassembly.
Figure 10:
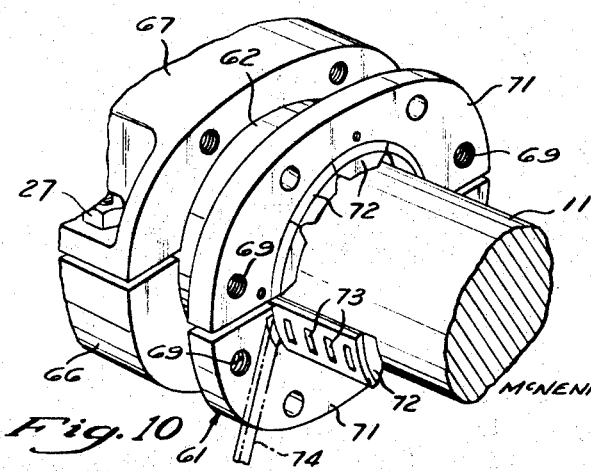
FIGURE 10 is a fragmentary, perspective view of the bearing illustrated in FIGURES 8 and 9 showing one method of bearing stave removal.

The embodiment of FIGURES 8 through 10 also provides individual staves positioned within liners. In this embodiment, the liners 61 and 62 are provided with axially spaced, outwardly extending ribs 63, which are aligned with and abut inwardly extending ribs 64 on the housing members 66 and 67. When the bearing is assembled, as illustrated in FIGURE 8, engagement between the ribs 63 and 64 positions the liners 61 and 62 inward toward the shaft 11. The same type of clamping structure is provided between the housing members 66 and 67 in this embodiment as is provided in the embodiment of FIGURE 2.

For service and repair, the clamping nuts are loosened to release the clamping pressure. Jacking screws 68 are then threaded into threaded openings 69 and bear against the end of the associated housing to jack the associated liner out to the position illustrated in FIGURE 9. In FIGURE 9, the jacking screws 68 have been rotated into the plane of the section for purposes of illustration. However, they are preferably located on the flanges 71 of the liners 61 and 62, as illustrated in FIGURE 10.

When the liners are in the position illustrated in FIGURE 9, the ribs 63 and 64 are located adjacent the recesses between the ribs of the associated member and additional radial clearance is provided. Here again, the propeller shaft 11 is lifted by suitable means to release the pressure on the staves 72.

In this instance the end plates 42 at one end are mounted on the housing members 66 and 67 and at the other end on the liners. After the plates 42 are removed, the staves 72 can then be moved axially out of the assembly for replacement or servicing. The staves 72 are provided with axially spaced recesses 73, which are proportioned to receive the end of a lever 74 and the liners are formed with chamfers 70 so that the staves may be levered out of the liners, as illustrated in FIGURE 10. Cam surfaces 75 cause inward movement of the liners when they are returned to the assembled position.

FIGURES 11 and 12 illustrate an embodiment of this invention wherein the staves 81 are formed entirely of an elastomeric material and are subjected to compressive staves by the housing assembly to a prestressed condition during the assembly of the bearing. In this instance, the lower housing member 17 and the upper housing member 18 are proportioned so that opposed faces 82 and 83 on the housing members 17 and 18, respectively, are clamped into engagement as illustrated in FIGURE 12 by the clamping means. The clamping means may be of the same type as illustrated in FIGURE 2. Interengagement between the opposing stop surfaces 82 and 83 limits the compressive force applied to the staves 81 when the inner bearing surfaces 38 are properly positioned with respect to the shaft 11 and the desired amount of prestressing of the staves is achieved.

The staves 81 illustrated in FIGURES 11 and 12 extend around the shaft for 90 degrees in the assembled condition and are sized in their unstressed condition as illustrated in FIGURE 11. When the longitudinal edges 84 abut, a clearance 86 is provided between the faces 82 and 83, and a substantial amount of clearance 87 is provided between the shaft 11 and the inner bearing surfaces 38.

In one embodiment proportioned for use with a six-inch shaft 11, the individual stave members 81 are sized so that each stave has a peripheral length between its longitudinal edges 84 one-eighth of an inch greater than the corresponding dimensions after the stave is prestressed. In this instance, each clearance 86 is equal to one-quarter of an inch and the compression by the clamping means reduces the peripheral length of the exterior of the assembled staves by one-half inch when the condition of FIGURE 12 is reached.

The radial inward deformation or contraction of the staves 81 results in a gripping pressure between the exterior curved surface 88 of the staves and the mating interior surfaces 89 of the two housing members 17 and 18 so that the staves are locked in position in a manner similar to the previous embodiments.

The radially inward contraction produced during the clamping also reduces the clearance between the bearing surfaces 38 and the exterior of the shaft 11 to the desired degree. Since the material forming the staves 81 is prestressed and closely fits the shaft shaft deflections under load are reduced and vibration is minimized.

In order to prevent pinching of the stave material between the surfaces 82 and 83 during the clamping operations, a relief 90 is provided on each stave at the junction of the exterior surface 88 and the longitudinal edges 84. During compression, the material of the staves flows into this relief and full contact is provided as illustrated in FIGURE 12.

In this embodiment end plates 42, mounted as indicated in FIGURES 2 and 3, are used to axially locate and grip the staves 81. In some instances the axial gripping may be used to provide the principal locking of the all elastomeric staves 81 since axial compression of the elastomeric material produces a radial locking pressure between the outer surface of the staves and the inner surface of the housing.

FIGURES 4 and 5 are comparative illustrations of the staves 81 and 29. Because the stave 29 of FIGURE 4 is provided with a rigid backing member compressive deformation is slight during assembly. Therefore, the stave itself remains substantially the same size during assembly. However, when the stave is formed entirely of elastomeric material, as illustrated in FIGURE 5, the longitudinal edges 84 are subjected to substantial compressive stress to the position illustrated by the dotted lines 91 during assembly of the bearing. This results in a radial thickening of the staves to reduce clearance and some reduction in the cross section of the grooves.

The unbacked staves may also be used in a housing assembly including liners as illustrated in FIGURES 6 or 8. In such instance, the liners are proportioned so that their longitudinal edges abut and limit compression of the staves when proper assembly is completed. In such instances, the opposed faces of the housing members 17 and 18 are proportioned to also abut when assembly is complete.

In all of the embodiments of this invention illustrated, the staves themselves are provided with smooth outer curved surfaces which cooperate when the staves are assembled to define a surface of revolution about the bearing axis mating with the corresponding surface on the housing assembly. Therefore, the staves may be moved axially or circumferentially around the housing member as required. In addition, stop means are provided to limit the compressive movement and to insure precise location of the bearing surfaces of each of the staves when the bearing is completely assembled.

The backing members in the embodiments of FIGURES 2, 6, and 8, offer relatively high stress to small deformation, while the embodiment of FIGURE 11 offers relatively low stress to large deformation. The required stress or clamping force is predetermined according to the elastic modulus of the particular material, and the housing members provide the ultimate stop surfaces, as they should always meet forcibly when the assembly is secured.

In all embodiments, the staves may be removed or moved during service replacement and repair without removing the bearing over the ends of the propeller shaft 11. Therefore, it is merely necessary to provide jacking means to lift the weight of the propeller shaft off the bearing surfaces, and it is not necessary to remove the propeller itself.

While presently preferred embodiments of the apparatus of the present invention have been described herein, with reference to the accompanying drawings, it is understood that variations, modifications, omissions, and refinements which depart from the disclosed embodiments may be adopted without departing from the spirit and the scope of this invention as defined in the following claims.

What is claimed is:

1. A marine bearing assembly adapted to be mounted around a vessel's propeller shafting comprising housing means adapted to be positioned around said shafting, and a plurality of segmental bearing staves formed with an inner bearing surface adapted to provide bearing contact with the surface of the propeller shafting and cooperate with the bearing surface of the other of said staves to form a tubular bearing having a bearing axis, the exterior surface of said staves cooperating to define a surface of revolution around said axis engaging substantially throughout its entire extent with a mating inner surface on said housing means, the longitudinal edges of said staves being substantially uninterrupted straight surfaces providing a substantially continuous surface contact with the adjacent staves, said housing means including clamping means releasably pressing said inner surface into locking engagement with the exterior surfaces of said staves and providing substantially the entire locking of said staves in said housing means, and stop means opposing said clamping means when said staves are in a predetermined position and accurately determining the position of said inner bearing surfaces of all of said staves, loosening without complete release of said clamping means permitting axial removal and replacement of said staves in said housing means without removing said bearing assembly over the end of said shaft and permitting circumferential movement of said staves along the space between said shaft and housing means.

2. A marine bearing as forth in claim 1 wherein said housing means include separable housing members, and said stop means are opposed surfaces on said housing members.

3. A marine bearingas set forth in claim 1 wherein at least part of each stave is formed of elastomeric material, and said inner bearing surface is provided by said elastomeric material.

4. A marine bearing as set forth in claim 3 wherein said inner bearing surface of said staves is concave with a radius of curvature substantially equal to the corresponding portion of the shaft when said shaft is out of contact with said bearing surface.

5. A marine bearing as set forth in claim 1 wherein said surface of revolution and mating inner surface are cylindrical surfaces.

6. A marine bearing as set forth in claim 5 wherein each stave is provided with a rigid backing member, and the longitudinal edges of said backing member serve to accurately locate said staves relative to each other.

7. A marine bearing as set forth in claim 6 wherein the exterior surfaces of said backing member cooperate to form said cylindrical surface and abut adjacent backing members substantially continuously along their edges when properly assembled.

8. A marine bearing as set forth in claim 7 wherein there are at least four similar staves in said assembly.

9. A marine bearing as set forth in claim 1 wherein said housing means includes a lower member adapted to be supported on said vessel, and an upper mating member movable toward said lower member by said clamping means, said upper member being free for movement away from said lower member when said clamping means are released.

10. A marine bearing as set forth in claim 1 wherein said housing means includes a main housing adapted to be supported on the vessel, and at least two liner members between and engaging both said main housing and said staves, said liner members providing said inner surface of said housing means and being movable toward each other by said clamping means.

11. A marine bearing as set forth in claim 10 wherein said main housing and liner members each include axially spaced ribs providing mating surfaces, said liners being axially movable with respect to said main housing from an assembled position wherein said ribs are aligned and said mating surfaces are engaged to a released position in which said mating surfaces are out of alignment, movement of said liners from said assembled position to said release position permitting radially outward movement of said liners with respect to each other.

12. A marine bearing as set forth in claim 10 wherein said liners are axially movable relative to said main housing and said clamping means includes camming surface means on said main housing and liners operable in response to relative axial movement between said main housing and liners to move said liners radially with respect to each other.

13. A vessel comprising a hull, a marine bearing assembly as set forth in claim 1 mounted thereon, a propeller shaft extending through and journaled in said marine bearing assembly, and a propeller mounted on the end of said shaft, sufficient clearance being provided at at least one end of said bearing assembly to permit axial removal and replacement of said staves with respect to said bearing housing.

References Cited

UNITED STATES PATENTS

| | | | |
|---|---|---|---|
| 702,947 | 6/1902 | Hill | 308—74 |
| 894,532 | 7/1908 | Reeves | 308—74 X |
| 1,325,553 | 12/1919 | Bacon | 308—74 |
| 1,674,317 | 6/1928 | Buff | 308—74 X |
| 1,885,339 | 11/1932 | Evans | 308—238 |
| 2,409,267 | 10/1946 | Gatke | 308—238 X |
| 2,636,790 | 4/1953 | McNally | 308—160 |
| 3,212,831 | 10/1965 | Crankshaw et. al | 308—74 X |
| 3,236,570 | 2/1966 | Satterthwaite | 308—15 |
| 3,317,254 | 5/1967 | Satterthwaite et al. | 308—26 |

FREDERICK L. MATTESON, JR., *Primary Examiner.*

ROBERT A. DUA, *Assistant Examiner.*